United States Patent [19]

Harmer

[11] 4,163,397

[45] Aug. 7, 1979

[54] OPTICAL STRAIN GAUGE

[75] Inventor: Alan L. Harmer, Geneva, Switzerland

[73] Assignee: Battelle Development Corporation, Columbus, Ohio

[21] Appl. No.: 846,799

[22] Filed: Oct. 31, 1977

[30] Foreign Application Priority Data

Jul. 27, 1977 [GB] United Kingdom .............. 31643/77

[51] Int. Cl.$^2$ ............................................. G01N 3/00
[52] U.S. Cl. ........................................ 73/800; 356/32
[58] Field of Search ................ 73/88 A, 800; 356/32; 340/380; 250/227; 350/96.10, 360

[56] References Cited

U.S. PATENT DOCUMENTS 4,071,753  1/1978  Fulenwider et al. ................ 250/227

*Primary Examiner*—Jerry W. Myracle
*Attorney, Agent, or Firm*—Thomas W. Winland

[57] ABSTRACT

An apparatus is disclosed for measuring strain in a solid object, wherein the apparatus is arranged to use the deflection of a light guiding structure as a strain responsive element for determining the amount of applied stress to be measured. The apparatus typically comprises a curved light guiding structure including a medium of given refractive index surrounded by a medium of lower refractive index than that of the medium of given refractive index; means for injecting light into the structure and means for analyzing the change in the propagation characteristics of the light emerging from the structure; and, means for attaching and maintaining the light guiding structure to the solid object in such a way that stresses acting upon the object are translated into changes of the curved form of the structure, creating changes in the propagation of the injected light whereby the strain in the object can be determined.

11 Claims, 3 Drawing Figures

OPTICAL STRAIN GAUGE

BACKGROUND

I. Field of the Invention

The invention relates to an apparatus for measuring strain in a solid object, and concerns apparatus arranged to use the deflection of a light guiding structure as a strain responsive element for determining the amount of applied stress to be measured.

II. Prior Art

Microbending losses in optical fibers have been thoroughly studied by theoreticians interested in the application of electromagnetic theory to a new guiding medium, and experimentally by fiber manufacturers who wish to avoid the adverse effects of bending on fiber characteristics.

Present theory is largely based on the early work of Marcatili in his publications in the Bell System Technical Journal, 1969, Volume 48, page 2103 and 2161, who investigated in a general way the effect of perturbations on light guiding structures. Possible loss mechanisms for light travelling in a bent guide are:

(1) Radiative loss. Some of the light traversing a bend may be radiated sideways out of the guide. The radiation attenuation coefficient ($\alpha_r$) can be calculated from $$\alpha = C_1 \exp(-C_2 r)$$

where r = radius of curvature of the bend
$C_1$, $C_2$ = constants independent of r.

(2) Mode coupling loss. Bending a guide creates higher order modes which may be attenuated by a lossy cladding.

(3) Mode conversion loss. This occurs for a straight guide mode entering or leaving a curved region.

A more simple, empirical description of microbending loss behaviour is provided by Zeidler in his publication in Optics Communications, 1976, volume 18, page 553. In an experimental system, the effect of periodic perturbations of an optical fiber was studied. The attenuation ($\alpha$) of the light (in dB/m in the fiber was described by the following empirical power law)

$$\alpha = b_1 \cdot \Delta^{b_2}$$

where $\Delta$ is the amount of deformation (in $\mu m$), and
$b_1$, $b_2$ are constants independent of $\Delta$.

Values of $b_1$ range from $10^{-3}$ dB/m $\mu m^{-b_2}$ for small periodicity (bend repeat distance 0.25 mm) to $10^{-16}$ for large periodicity (bend repeat distance 20 mm), and values of $b_2$ range from 2-4 for multimode fibers to 4-6 for single mode fibers.

U.S. Pat. No. 3,602,037 discloses an apparatus for measuring minute deflections of a thin glass rod in a liquid flow gauge to determine the liquid flow or small movements acting on the rod. This known proposal for a liquid flow gauge uses absorption of a light beam injected into the rod on reflection from its walls. The rod is straight, and is provided with a light absorbing coating of higher refractive index than the rod. This liquid flow gauge uses a reflection configuration of the light passing both ways through the device, i.e., through the rod, in order to determine the deflection of the rod. This design especially increases the scattered light level making the gauge relatively insensitive and gives a non-linear relationship between the light intensity and the deflection of the rod. It operates over a limited range of deflections and it is not well adapted to use fibre optic coupling. It is difficult to measure tensile stresses of objects other than the rod itself and can only be adapted to measure bending shear stresses with a reasonable sensitivity.

It is an object of the present invention to provide an apparatus for measuring strain in solid objects, especially tensile strain, which apparatus is relatively simple in its design and which can replace standard strain gauges. This invention seeks to increase the sensitivity of an optical fibre to bending, rather than the contrary.

SUMMARY

According to this invention an apparatus responsive to strain in a solid object comprises a curved light guiding structure including a medium of given refractive index surrounded by a medium of lower refractive index than that of the medium of given refractive index; means for injecting light into the structure and means for analyzing the change in the propagation characteristics of the light emerging from the structure; and, means for attaching and maintaining the light guiding structure to the solid object in such a way that stresses acting upon the object are translated into changes of the curved form of the structure creating changes in the propagation of the injected light whereby the strain in the object can be determined.

The optical propagation characteristics of a waveguide sugh as the light guiding structure is understood to mean the form of the electric and magnetic field pattern of the light travelling in the waveguide. Changes in the field pattern produce changes in the light propagation which lead to changes in the transmitted light through the waveguide, or to changes in the light radiated out sideways from the structure or to changes in the distribution of the light energy among diferent modes in the waveguide, or to changes in the temporal dispersion of a pulse of light travelling in the waveguide. These changes are analyzed by measuring the transmitted light intensity, or the sideways radiated light, or the spatial distribution of the light modes or the pulse dispersion of a pulse of light.

The light guiding structure used according to the invention can be a coated or uncoated structure. In the case of an uncoated structure the medium of lower refractive index surrounding the light guiding structure of given refractive index could be, for instance, air or other fluid medium. It is, however, preferred that the light guiding structure is coated or cladded with a solid medium of lower refractive index than the given refractive index. Such a structure is relatively insensitive with regard to touching when being manipulated or when secured to a substrate.

It should also be noted that the optical strain gauge according to the invention works when using monomode light guiding structures as well as multimode structures.

A strain gauge according to the present invention can be applied to the measurement of strain, pressure, small movements, etc. Although one bend or curve of the light guiding structure is sufficient in order to carry out the invention since the propagation of the light waves is changed in the event that the bend is distorted, it is preferred that more than one bend is provided, and furthermore, it is preferred that the light guiding structure is arranged with periodically repeating bends. Such a plurality of bends increase the change in the propagation of the light injected into the light guiding structure, which increases the sensitivity of the optical strain gauge according to the invention. Typically the light guiding structure comprises at least one fibre or thin film made of glass or other optical guiding material, for instance a transparent plastic material such as polystyrene or polymethylmethacrylate.

In accordance with this invention the means for attaching and maintaining the structure comprise at least two fixed areas or points to which the light guiding structure is attached, and which maintain the general curved form of the structure. The fixed points or areas may be, for instance, studs or protrusions provided on two separate parts of a substrate through which parts the light guiding structure, i.e., a glass fibre is passed. In case the two parts with its protrusions are moved relatively to each other, the bend of the glass fibre is distorted or deflected, so that the propagation characteristics of light injected in the fibre are changed. This change is used as a means for determining the degree of the movement of the two parts, which in turn is proportional to the strain.

According to the invention it is also possible to produce the structure in the curved form and to fix it to a substrate or directly to the object during the manufacture of the light guiding structure. This specific embodiment of the invention enables the production of a strain measuring device as an optical integrated circuit by film evaporation, etching, etc.

Preferably the given refractive index of the medium (the inner medium) is higher on the order of about $3 \times 10^{-3}$ to $30 \times 10^{-3}$ than the refractive index of the surrounding medium.

DESCRIPTION OF THE PREFERRED EMBODIMENT

Figure 1:
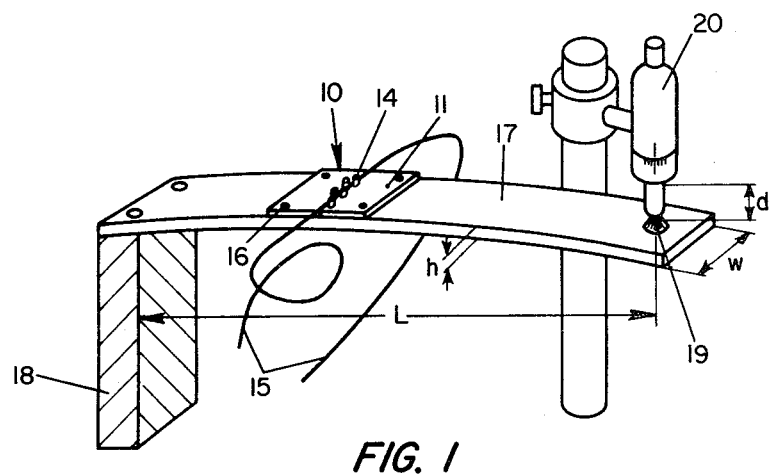
FIG. 1 is a schematic, perspective view of one embodiment of an optical strain gauge according to the invention.
Figure 2:
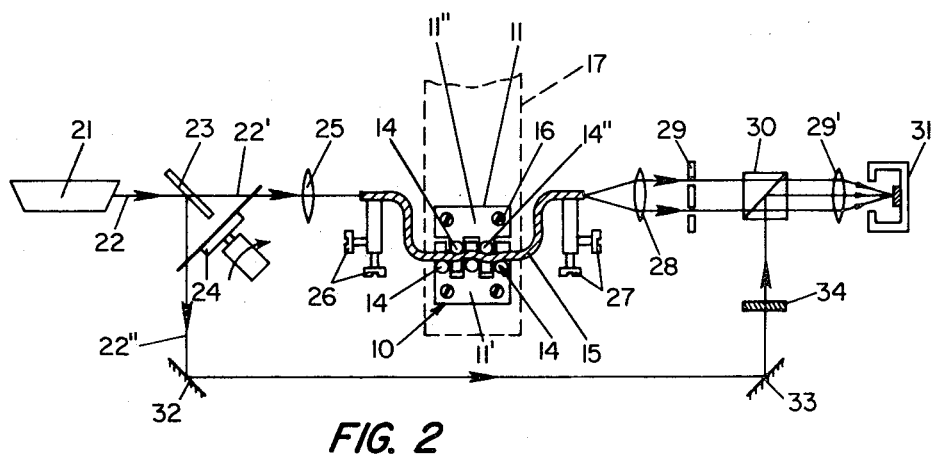
FIG. 2 is a schematic diagram of a dual-beam optical arrangement used in connection with the gauge shown in FIG. 1.

With reference to FIGS. 1 and 2, there is shown an optical strain gauge 10, comprising a substrate 11, including two series 14', 14" of studs 14, each series 14', 14" being arranged in a row on a separate part 11' and 11" respectively of the substrate 11. The studs 14 of each series 14', 14" are arranged with respect to the other series in such a way that a light guiding structure, i.e., a glass fibre 15, arranged between the two series of studs 14', 14" is periodically deflected or bent as shown in FIG. 2.

Parts 11' and 11" of the substrate 11 are secured by suitable means such as screws 16, bolts or by glueing to an object 17 the strain of which is to be measured. This object 17 is shown in FIGS. 1 and 2 as a simple stainless steel cantilever bar 150 mm long between the edge of its support 18 and the centre of the steel balls mounted either side of it one ball 19 being shown in FIG. 1. The displacement of the cantilever bar can be varied by a micrometer screw 20 which bears on the steel ball 19 on the upper side of the cantilever bar. The micrometer screw 20 can be mounted either above (for producing tensile strain in the gauge) or below the bar (for producing compressive strain).

The strain $\alpha$ at the surface of the cantilever is related to the dimensions of the bar (length l=150 mm, height h=3.29 mm), and the displacement d:

$$d = l^2 \cdot \epsilon / h = 6.84 \times 10^3 \cdot \epsilon \tag{1}$$

The strain in the gauge 10 is higher than this because the fiber 15 is mounted further away from the neutral surface of the cantilever. A correction factor of 1.33 was used in carrying out calculations.

As mentioned, between the two series 14', 14" of studs 14 the glass fibre 15 is periodically bent, and upon distortion of this glass fibre 15 by manipulating the micrometer screw 20, the light propagation in the fibre 15 is changed, since the two rows of studs 14 are being moved relative to each other. This change can be used as a means of determining the degree of bending of the substrate 11 and furthermore of the object 17 to which the substrate 11 is secured, which bending is a function of the strain applied.

The optical arrangement for carrying out the measuring of the changes of the propagation of light in the glass fibre 15 is a standard dual-beam one and is shown diagrammatically in FIG. 2. A laser apparatus 21, being a He-Ne laser, produces a laser beam 22 of a wavelength of 633 nm. This laser beam 22 is passed through a beam splitter 23, which splits beam 22 into beams 22' and 22". Laser beam 22' continues along its straight path through a chopper 24 and a fibre injection lens 25 into the fibre 15, which is arranged, in accordance with FIG. 1, to be periodically bent by the two series 14', 14" of studs 14. By adjusting both parts 11', 11" with regard to each other the periodic bending of the fibre 15 can be varied. Two sets of screws 26, 27 form micromanipulators which enable mounting and aligning of the fibre 15 with regard to the rest of the optical arrangement.

Once the parallel light beam 22' injected into one end of the fibre 15 leaves this fibre 15 at its opposite end, it enters a lens or lens system 28 for parallel image analysis, a spatial filter 29, a split prism 30 for beam recombination, another lens 29' again for parallel image analysis and a photodetector 31, which may be a silicon photodetector (e.g., photodiode).

Spatial filters, consisting of sets of concentric rings (0–1°, 1–2°, etc.) are used to analyze the modal distribution of the light output. Light beam 22" also passes through chopper 24, is reflected by mirrors 32 and 33 and then passes through a neutral density filter 34 and into the split cube 30 for beam recombination.

Variations of bending of the support 18 influence the shape and accordingly the strain of the periodically bent fibre 15, which changes the propagation of light in the fibre. This change of propagation of the light is monitored by photodetector 31 and used to determine the degree of the variation of strain acting on substrate 11 and support 18.

Chopper 24, having a frequency of approximately 50 to 150 Hz, comprises a chopper disc having three solid blades which are slightly larger than the three intervening spaces. This ensures that light from beam 22', being the signal beam, and from beam 22", being the reference beam, cannot overlap in photodetector 31. This reduces the noise which would otherwise be caused by overlapping of the beams and avoids any danger of interferometric effects. This recombination of the two beams 22' and 22" (signal and reference) in the split prism 30 and focussing onto the photodetector 31 was chosen because of its high uniformity of response across the surface of the diode. The intensity of the reference beam is matched to that of the signal beam by inserting neutral density filters.

The photodiode signal is phase-sensitive detected by a lock-in amplifier (not shown). Single-beam optics, i.e., without the reference beam, gave a noise level of about 5% of the total light level. Dual-beam optics reduced the noise to $10^{-3}$. This provided a reasonable S/N ratio and long-term drift stability to carry out extensive measurements. Tests have been carried out with gauge 10 using fibre 15 according to the following table:

| Type | S-20 | SIL-K |
|---|---|---|
| Manufacturer | Fiber Communications Inc. | Corning Glass Works |
| Index Profile | step | step |
| Core refractive index | 1.45 | — |
| Numerical aperture | 0.16 | 0.18 |
| Attenuation dB/km at 0.8 μm | 11 | 8 |
| Core diameter | 55 μm | 85 μm |
| Fibre diameter | 90 μm | 120 μm |
| Core material | Doped silica glass | Doped silica glass |

With various fibers 15 the following maximum (Rmax) and minimum (Rmin) bending radii can be used:

|  | a | Rmax | Rmin |
|---|---|---|---|
| multimode fibre | 100 μm | 1000 mm | 10 mm |
| monomode fibre | 10 μm | 100 mm | 1 mm |
| integrated circuit waveguide | 1 μm | 10 mm | 0.1 mm | whereby a = core diameter or typical dimension of the light guiding structure (fibre) 15.

The strain gauge shown in FIGS. 1 and 2 measures 20×10×1 mm. It is clear that its size can be reduced considerably, and is ultimately limited by the fibre size which can be as small as 10 μm thick. Thus it should be possible to make an optical gauge of the same size and design as any foil or semiconductor strain gauge. Different forms of the gauge are also possible. The fibre may be held in a holder with a desired profile for example a thin etched metal sheet, may be glued between two sheets of plastics material, or may be wound round a set of pins as shown in FIGS. 1 and 2. In addition, most of the traditional gauge shapes are realizable, e.g., delta, rosette, herringbone, tangential, radial, etc.

A thin-film surface guide can be made by techniques very similar to those used in the preparation of integrated electronic circuits. The light is conducted along a surface layer of light guiding material a few microns deep, and bend radii of a few tens of microns may be readily produced. This type of gauge can be made smaller (5 mm square).

Figure 3:
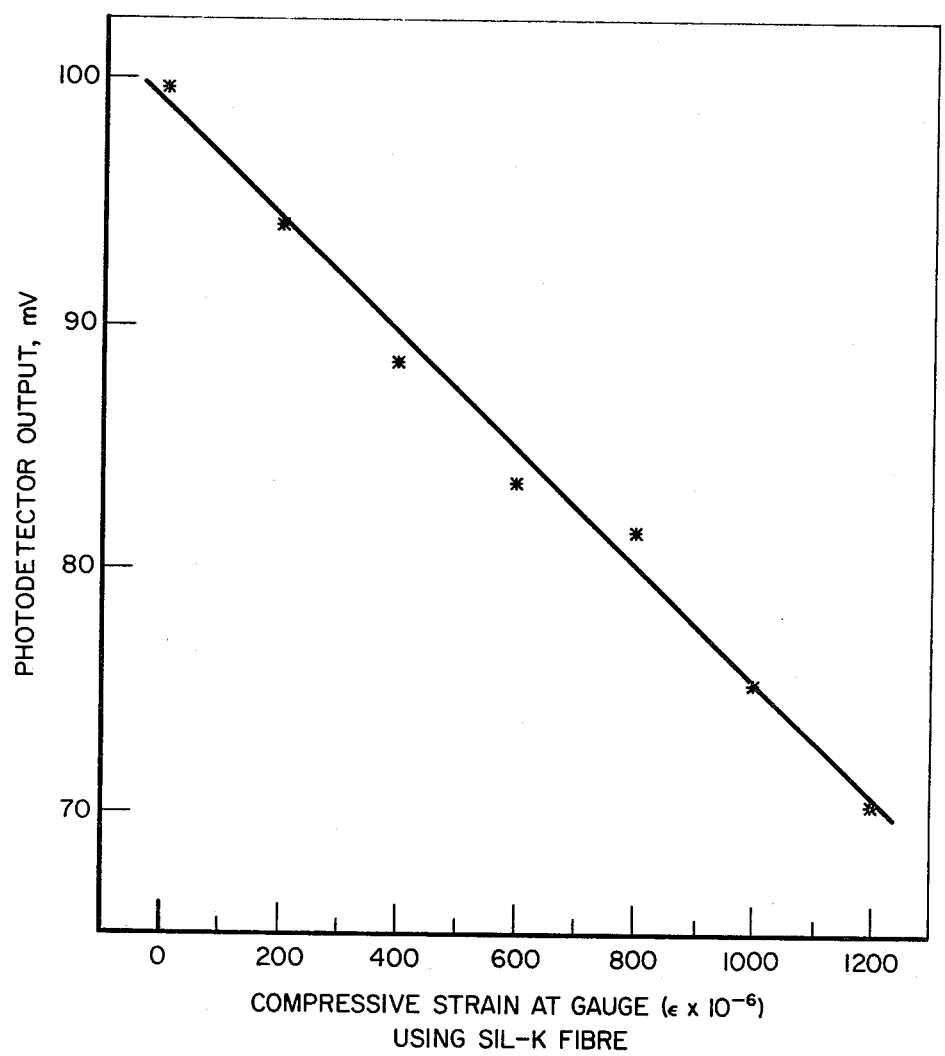
FIG. 3 is a graph showing the result of strain measurements carried out with the optical strain gauge according to FIGS. 1 and 2.

FIG. 3 shows the results of compressive strain measurements made with the optical strain gauge according to FIGS. 1 and 2. The strain as shown on the horizontal of FIG. 3 was produced by turning of the micrometer screw 20 and calculated by introducing the displacement d according to FIG. 1 into equation (1). The readings of photodetector 31 (vertical axis) reflect the direct dependancy of the read-out upon the strain applied to the cantilever bar 17.

Since the so-called "gauge factor" is a decisive parameter concerning the sensitivity of any strain gauge, the gauge factor of the optical strain gauge according to the present invention will be discussed briefly below.

The strain gauge factor of an optical gauge may be defined as $$K = 1/\epsilon \cdot dI/I$$

where
 $\epsilon$ is the strain
 dI is the change in the transmitted light intensity
 I is the transmitted light.

The strain gauge factor for a particular gauge is a significant parameter since it expresses the sensitivity of the gauge to detect small strains. Commercial resistance gauges, foil/wire gauges typically have a gauge factor of 2, and semiconductor gauges are more sensitive having a gauge factor of 100. The gauge factor derived from FIG. 3 is 250, showing that the gauge of the present invention has a high sensitivity.

The optical strain gauge of the present invention has considerable potential, and is capable of the same performance or better than commercial foil and semiconductor gauges, with a number of valuable advantages and interesting design possibilities. For example, a gauge according to this invention can work both in tension and compression. The gauge can be easily matched for temperature compensation to most substrates and it offers the attraction of an extremely simple and cheap construction technique. In addition, it has a number of advantages, particularly for certain applications. It is immune from electromagnetic interference, ground level shifts, and requires no overload protection, it has decreased interface problems, freedom from crosstalk, short and open circuits and terminal isolation. The gauge is electrically isolated from the measured function. It is suited to adverse or hazardous working environments. The gauge is ideally suited for safety systems. There is no electrical fire danger and it requires very low power. It has also size and weight savings, which is important for aerospace applications. Wiring with optical cables may greatly simplify the installation and testing of structures, resulting in reduced errors and lower costs, e.g., wavelength multiplexing.

What we claim is:

1. Apparatus for measuring strain in a solid object, comprising a curved light guiding structure comprised of a first medium surrounded by a second medium of lower refractive index than that of the first medium, means for injecting light into the structure and means for analyzing the change in the modal propagation characteristics of the light emerging from the structure, means for attaching the light guiding structure to a solid object in such a way that in use, stresses acting upon the object are translated into changes in the curvature of the structure creating changes in the modal propagation of the injected light.

2. Apparatus according to claim 1 in which said structure comprises at least one fibre strand or thin film of glass or a plastic material.

3. Apparatus according to claim 1 in which means for attaching the structure to an object comprise at least two fixed areas to which the light guiding structure can be attached maintaining the generally curved form of the structure.

4. Apparatus according to claim 1 in which the light guiding structure is produced in the curved form and fixed to a substrate or directly to an object whose strain is to be measured during the manufacture of said light guiding structure.

5. Apparatus according to claim 1 in which the refractive index of the first medium is in the order of about $3 \times 10^{-3}$ to $30 \times 10^{-3}$ higher than the refractive index of the second medium.

6. Apparatus according to claim 1, wherein the light-guiding structure comprises the first medium coated or cladded with a solid second medium.

7. Apparatus according to claim 1, wherein the second medium is a fluid.

8. Apparatus according to claim 7, in which the second medium is air.

9. Apparatus according to claim 1, wherein the light guiding material is provided with a plurality of bends.

10. Apparatus according to claim 9, in which the light guiding material is provided with a plurality of bends arranged substantially symmetrically about a median line.

11. Apparatus responsive to strain in a solid object comprising light injecting means and light detecting means for monitoring changes of light intensity caused by changes in the modal propagation, a curved light guiding structure including a first medium of a given refractive index surrounded by a second medium of lower refractive index than that of the first medium, means for attaching and maintaining the light guiding structure to a solid object in such a way that, in use, stresses acting upon the object are translated into changes of the curved form of the structure, creating changes in the modal propagation of the injected light and thereby creating changes of light intensity, whereby the strain in the object can be determined.

* * * * *

UNITED STATES PATENT OFFICE
CERTIFICATE OF CORRECTION

PATENT NO. : 4,163,397
DATED : August 7, 1979
INVENTOR(S) : Alan L. Harmer

It is certified that error appears in the above–identified patent and that said Letters Patent are hereby corrected as shown below:

Column 2, line 31, "sugh" should read -- such --.
Column 4, line 4, "$\alpha$" should read -- $\epsilon$ --.

Signed and Sealed this

Thirtieth Day of October 1979

[SEAL]

Attest:

RUTH C. MASON
Attesting Officer

LUTRELLE F. PARKER
Acting Commissioner of Patents and Trademarks